United States Patent [19]
Rockwood

[11] Patent Number: 5,647,735
[45] Date of Patent: Jul. 15, 1997

[54] CENTRIFUGAL PUMP HAVING OIL MISTING SYSTEM WITH PIVOTING BLADES

[75] Inventor: Robert E. Rockwood, Windham, N.H.

[73] Assignee: Environamics Corporation, Hudson, N.H.

[21] Appl. No.: 645,906

[22] Filed: May 14, 1996

Related U.S. Application Data

[63] Continuation-in-part of Ser. No. 635,398, Apr. 26, 1996, which is a continuation of Ser. No. 320,692, Oct. 11, 1994, Pat. No. 5,513,964.

[51] Int. Cl.$^6$ .................................................. F04B 35/04
[52] U.S. Cl. .................. 417/423.13; 415/175; 415/109; 184/11.2
[58] Field of Search ............... 417/423.12, 423.13; 415/109, 175; 184/11.1, 11.2, 6.26, 55.1, 61

[56] References Cited

U.S. PATENT DOCUMENTS

| | | |
|---|---|---|
| 2,632,281 | 9/1953 | Schmidt, Jr. |
| 2,950,943 | 6/1960 | Forrest. |
| 3,499,503 | 3/1970 | Murray et al. ............... 184/11.1 |
| 4,073,596 | 2/1978 | Erickson et al. ............... 415/175 |
| 5,261,676 | 11/1993 | Rockwood. |
| 5,340,273 | 8/1994 | Rockwood. |
| 5,513,964 | 5/1996 | Rockwood. |

*Primary Examiner*—Charles G. Freay
*Attorney, Agent, or Firm*—Myers Liniak & Berenato

[57] ABSTRACT

A lubrication system for equipment (e.g. centrifugal pump) employing a rotating shaft and corresponding support bearings is disclosed. The lubrication system includes a lubricant dispenser having a plurality of blades or dispensing members pivotally attached thereto, the dispenser affixed to the shaft for rotation therewith. Centrifugal force created by rotation of the shaft to which the dispensing blades are attached causes the blades to extend radially outward from the shaft center during operation so as to dispense the lubricant throughout a lubricating or misting chamber in order to lubricate the adjacent bearings. The system is also advantageous in that the blades are permitted to pivot or flap downward toward the shaft in either direction so that the dispenser may be more easily inserted into the misting chamber during manufacturing of the device or replacement of the lubricating system. In such a manner, a lubricant dispenser having an operating outer diameter greater than the diameter of the opening through which it is inserted during the manufacture of the pump or the replacement of the lubrication system is provided. This also allows the lubricant fluid level in the misting chamber to be lowered if desired so as to reduce heat generation during operation.

16 Claims, 4 Drawing Sheets

CENTRIFUGAL PUMP HAVING OIL MISTING SYSTEM WITH PIVOTING BLADES

This application is a continuation in part of U.S. Ser. No. 08/635,398, filed Apr. 26, 1996, which is a continuation of Ser. No. 08/320,692 filed Oct. 11, 1994 U.S. Pat. No. 5,513,964, issued May 7, 1996.

This invention relates to a lubrication system for a device, such as a centrifugal chemical processing pump, employing a rotating shaft with corresponding shaft supporting bearings. More particularly, this invention relates to a lubrication system for lubricating shaft supporting bearings, the system including a lubricant dispenser affixed to the shaft for rotation therewith and wherein the dispenser includes a plurality of pivotally mounted members for dispensing lubricant toward the bearings.

This application is related to U.S. Pat. No. 5,513,964, issued May 7, 1996, and U.S. Ser. No. 08/635,398, filed Apr. 26, 1996, the disclosures of which are both hereby incorporated herein by reference.

BACKGROUND OF THE INVENTION

Environmentally hazardous fluids, such as acids, oils, and toxins, often need to be pumped throughout fluid flow systems from one location to another. Centrifugal chemical processing pumps including a motor driven impeller affixed to a pump shaft are typically utilized in pumping such fluids. See, for example, U.S. Pat. No. 5,411,366, the disclosure of which is hereby incorporated herein by reference.

The shafts of such pumps are typically rotatably supported against radial movement and vibration by conventional pump shaft bearings (e.g. ball bearings). These bearings must be continually lubricated throughout the operation of the pump in order to reduce maintenance requirements and maintain a satisfactory operating life of the bearings and thus the pump.

Conventional lubricating fluid, such as oil, is typically used to lubricate such pump shaft bearings. Conventional chemical processing pumps typically include ball bearings for supporting the pump shaft, the bearings being disposed within a misting or lubrication chamber. In the prior art, these shaft supporting ball bearings are typically lubricated by positioning the oil level within the lubrication chamber at a level or position about half-way up the bottom bearing ball. Maintaining the lubricating oil at such a position necessarily means that when the shaft and supporting bearings are rotated, the balls must continuously plow through the lubricating oil in which they are partially submerged. This results in undesirable heat generation within the bearings and adjacent to pump shaft, such heat being caused by the friction created by the balls continually passing through the lubricating oil. Such heat generation increases maintenance requirements and reduces the operating life of the bearings.

If the oil level could be lowered, less heat would be generated. However, a lower oil level requires a dispenser having a larger outer diameter. Next is the issue of how to get the bearing lubrication system (including a large rotating dispenser) into the misting or lubricating chamber adjacent the bearings. Typically, it is desirable to slide the lubricant dispenser into the misting chamber along with the shaft and bearings through a hole or bore in the body of the pump. Thus, in the past, the size (i.e. outer diameter) of the lubricant dispenser which could be inserted into the misting chamber in such a manner has been limited by the diameter of the hole or bore in the pump. In other words, one could not insert a lubricant dispenser into the misting chamber if the outer diameter of the dispenser was greater than the interior diameter of the bore existing in the pump.

It is apparent from the above that there exists a need in the art for a lubricant dispenser which may be inserted into rotating equipment (e.g. chemical processing pump) wherein the outer diameter of the lubricant dispenser during operation is greater than the inner diameter of the space in the pump through which the dispenser must be inserted. It is also a purpose of this invention to provide a lubrication system wherein the fluid is maintained at a level below the bearing balls disposed in the chamber so as to reduce heat generation caused by the balls plowing through and being submerged in a lubricating fluid. The lower lubricant level necessitates a larger dispenser according to certain embodiments.

It is the purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a centrifugal pump for pumping a liquid to be pumped, the pump comprising:

a pump housing;

a rotatable shaft disposed at least partially within said housing;

a lubrication chamber surrounding the shaft, the chamber for housing a lubricating fluid;

shaft supporting bearings disposed in or adjacent the lubrication chamber, the bearings to be lubricated by the lubricating fluid;

a dispenser including a base support member and a plurality of collapsible dispensing members pivotally attached thereto, the dispenser being attached to the shaft for rotation therewith and for dispensing the lubricating fluid in the chamber in order to lubricate the bearings; and wherein the collapsible dispensing members are pivotally attached to the support member so that the dispensing members can collapse axially along the shaft when the shaft is not rotating thereby enabling the dispenser to be more easily inserted into the chamber during the manufacture of the pump or during maintenance being performed thereon.

This invention still further fulfills the above-described needs in the art by providing a method of inserting a lubricant dispenser into a misting chamber of a pump, the method comprising the steps of:

providing a pump including a misting chamber therein, the pump including a bore adjacent the misting chamber through which the lubricant dispenser is to be inserted;

providing a lubricant dispenser having a plurality of collapsible dispensing members pivotally attached around the outer periphery thereof;

collapsing the dispensing members prior to insertion of the dispenser into the chamber;

inserting the dispenser with collapsed dispensing members through the bore and into the misting chamber; and operating the pump so that centrifugal force created by rotation of a pump shaft to which the dispenser is attached causes the dispensing members to extend radially outward from the shaft in order to dispense lubricant throughout the misting chamber.

This invention will now be described with respect to certain embodiments thereof, accompanied by certain illustrations, wherein:

IN THE DRAWINGS

FIG. 1 is a side cross-sectional view of the oil misting chamber of a centrifugal chemical processing pump according to one embodiment of this invention, this misting chamber being disposed within a surrounding centrifugal pump of, for example, commonly owned U.S. Pat. No. 5,340,273, the disclosure of which is incorporated herein by reference. FIG. 1 illustrates the dispensing blades slightly angled from their actual operating positions where they extend radially away from the center of the pump shaft.

DETAILED DESCRIPTION OF CERTAIN EMBODIMENTS OF THIS INVENTION

Figure 1:
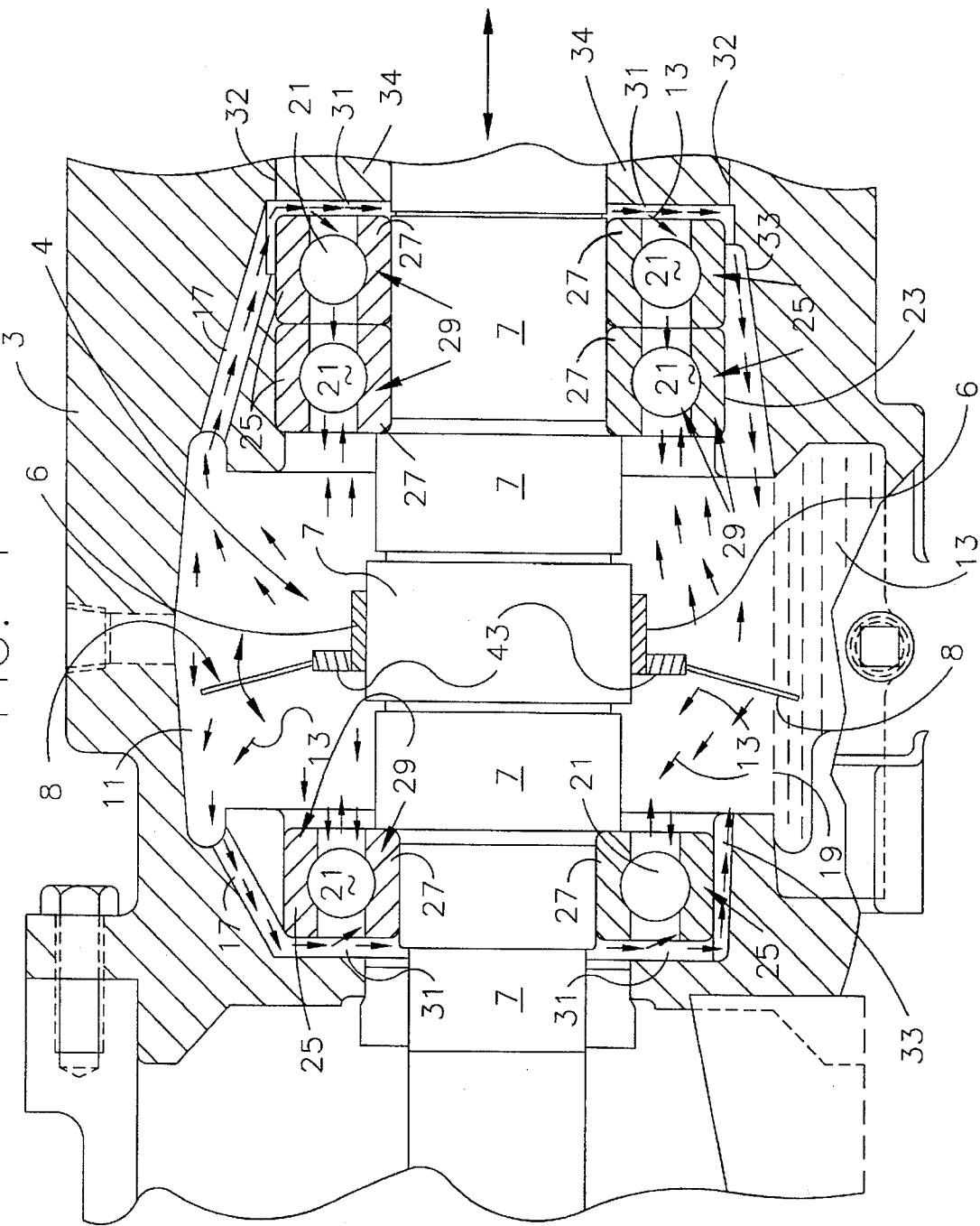

Referring now more particularly to the accompanying drawings in which like reference numerals indicate like parts throughout the several views.

Below described is a lubrication system according to certain embodiments of this invention used in conjunction with a chemical processing centrifugal pump having a centrally located rotating shaft. However, it will be understood by those skilled in the art that the lubrication system according to certain embodiments of this invention may be used in conjunction with other rotating equipment which utilize a lubricant sump for the purpose of lubricating supporting shaft bearings.

FIG. 1 is a side elevational partial cross-sectional view of the lubrication system of a centrifugal environmentally sealed chemical processing pump according to a particular embodiment of this invention. Illustrated in FIG. 1 is surrounding pump housing 3, in which misting or lubricating chamber 11 is defined. The centrifugal pump includes central rotating shaft 7 disposed between the pump motor and pump impeller. The fluid to be pumped is actually pumped by the impeller (not shown) which in turn is driven by the motor (not shown) via elongated shaft 7.

The misting or lubricating system illustrated in FIG. 1 includes dispenser 4 made up of supporting band 6 to which a plurality of lubricant dispensing members or blades 8 are attached. Blades 8 are collapsible in that they are pivotally attached to supporting band 6 so that they may pivot or flop (i.e. collapse) downward during both (i) insertion of the dispenser 4 into misting chamber 11 through bore 32; and (ii) during non-use of the pump when shaft 7 is not moving. In other words, blades 8 are collapsible by way of their mounting arrangement so as to allow the dispenser 4 to pass through the annular bore 32 that the bearing fits through during installation. The pitch of blades 8 can be altered from flat to heavily pitched in order to produce different misting effects.

For example, when the annular bore 32 through which the dispenser 4 is to be inserted is defined by the inner or interior diameter of a hole in the pump frame 25 (on either side of chamber 11), the diameter of dispenser 4 when members 8 are collapsed is less than the diameter of the bore. Thus, the dispenser with collapsed blades 8 may be inserted through the bore and into misting chamber 11. However, once in chamber 11, during pump operation when shaft 7 is rotated, blades 8 "stand up" so that the operating outer diameter of dispenser 4 is greater than the diameter of the bore 32 (and greater than the inner diameter of bearing frame(s) 25, and greater than the diameter defined by the radius at which bearing balls 21 roll in their raceways). The operating diameter of dispenser 4 is of course defined by the diameter around the outer periphery of blades 8 as they rotate within chamber 11.

When pump shaft 7 is driven by the pump motor, supporting band 6 and blades 8 affixed thereto rotate along with shaft 7 within annular lubricating chamber 11 thereby dispersing lubricating fluid (e.g. oil) throughout chamber 11 as shown in FIG. 1. When shaft 7 is rotated, the blades 8 are caused to extend radially away from shaft 7 (i.e. stand up) due to the centrifugal force created by the shaft 7 rotation. Thus, during rotation of shaft 7 when the pump is pumping, the outer diameter of the dispenser (defined by the outer diameter of blades 8) is greater than the inner diameter of the stationary hole or bore through which it was inserted. This is an improvement over the prior art.

Dispensing members or blades 8 dip into the lubricating fluid 13 below fluid level 19 when shaft 7 is rotated thereby dispensing or flinging the lubricant 13 throughout chamber 11 so that the lubricant makes its way into auxiliary passageways 17 and therefrom down into auxiliary chambers 31.

As shown in FIG. 1, the lubricating fluid level 19 within chamber 11 is, according to certain embodiments of this invention, maintained at a level below both bearing balls 21 and the outer diameter 23 of stationary outer bearing frames (i.e. outer races) 25. This lower lubricant level 19 requires a dispenser 4 with a larger working outer diameter than would otherwise be necessary so that the members 8 can reach into the lubricant below level 19.

Outer bearing frame portions or outer races 25 work in conjunction with inner bearing frame portions (i.e. inner races) 27 (affixed to shaft 7) so as to define ball raceways therebetween in which bearing balls 21 move during shaft 7 rotation. Together, bearing balls 21 in combination with bearing races 25 and 27 make up the bearings 29 of the centrifugal pump which are provided for the purpose of supporting shaft 7 during rotation thereof.

When the lubricant 13 is dispensed throughout chamber 11 by blades 8, the lubricant makes it way down auxiliary passageways 17 into chambers 31 on both sides of chamber 11. Once in auxiliary chambers 31, the lubricant is permitted to lubricate the bearing raceways, frames, and balls on all sides thereby improving performance. From auxiliary chambers 31, some of the lubricating fluid makes its way back into main chamber 11 through the gap between bearing races or frames 25 and 27. However, some of the lubricant from annular auxiliary chambers 31 makes its way back into main chamber 11 by way of passageways 33 disposed below outer bearing frames 25. Auxiliary passageways 17, auxiliary chambers 31, and passageways 33 are designed so that the lubricating fluid, once in passageway 17, makes its way through chambers 31 and passageways 33 due to the force gravity and back into main misting chamber 11.

Main chamber 11 may, according to certain embodiments, be provided with an outlet and inlet (not shown) in communication with an external lubricant reservoir. These are provided so that the lubricating fluid (e.g. oil) from chamber 11 may be circulated out of the pump, cooled and filtered in the external reservoir, and thereafter recirculated back into chamber 11 by way of the inlet (not shown).

Figure 2:
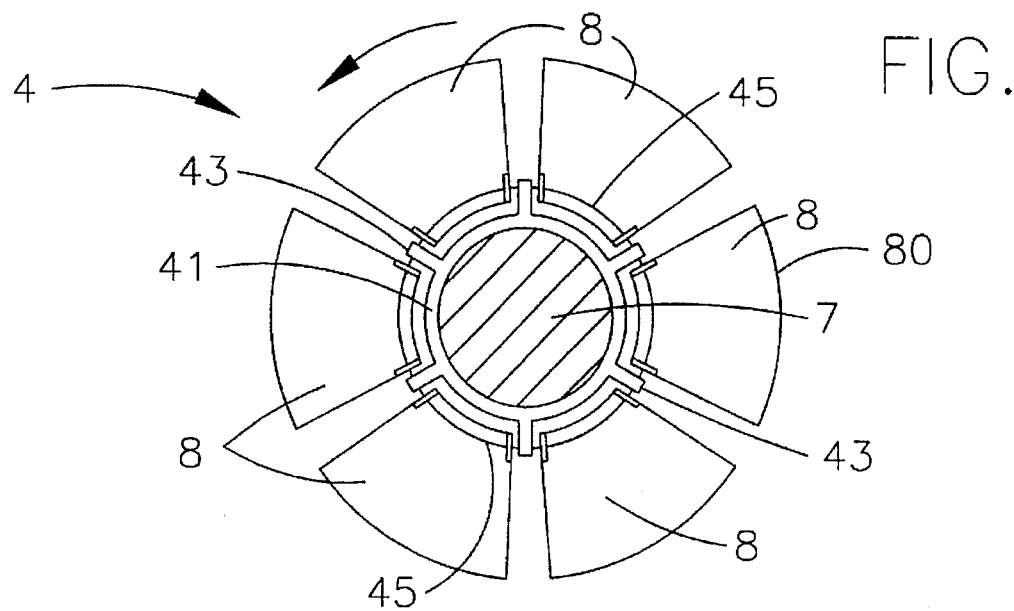
FIG. 2 is an end view (illustrating the shaft cross-sectionally) showing the FIG. 1 lubricant dispenser attached to the shaft.

FIG. 2 is an end view illustrating the lubricant dispenser 4 of FIG. 1. In FIG. 2, pump shaft 7 is illustrated cross-sectionally, while the remainder of dispenser 4 is illustrated in an elevational manner. As shown, a plurality of dispensing members or blades 8 are attached to shaft 7 for rotation therewith by way of base support band 41. Support band 41 is wrapped around and affixed to pump shaft 7 for rotation therewith. Support band 41 includes a plurality of projections 43 extending radially outward therefrom. Projections 43 are disposed between adjacent dispensing blades 8. Each projection 43 includes a passageway or aperture (57 or 65) defined therein for the purpose of receiving elongated wire member 45 which is fed therethrough and wrapped around shaft 7 through a plurality of such apertures or passages 57 or 65. Elongated member 45 is fed through the passages defined in projections 43 so that base support band 41 is disposed between shaft 7 and member 45. Wire member 45 is radially spaced outwardly from support band 41, while band 41 is positioned directly up against the external periphery of shaft 7.

Figure 3:
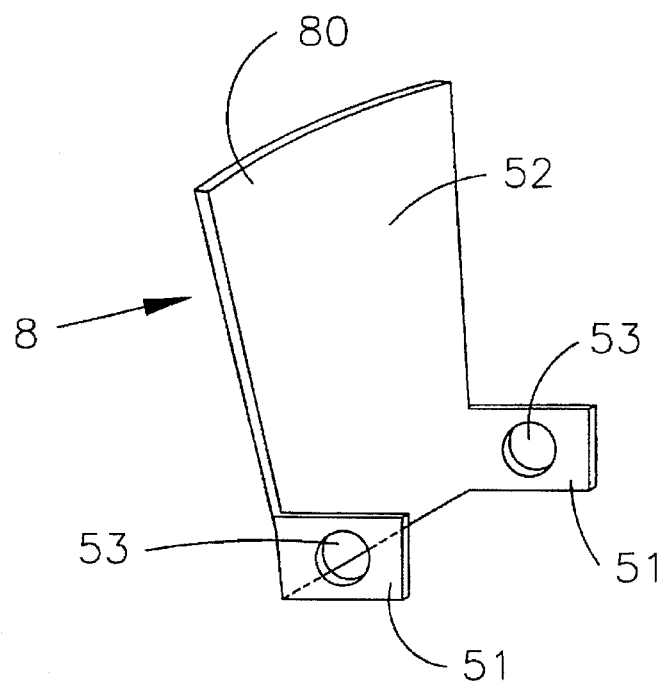
FIG. 3 is a perspective view illustrating one of the blades, or dispensing elements, which is attached to the shaft in FIGS. 1–2.

The plurality of arc-shaped dispensing members or blades 8 are attached to the shaft 7 and base support member 41 by way of elongated wire member 45. As illustrated in FIG. 3, each blade 8 includes a pair of projections 51 extending perpendicular relative to the main body 52 of the blade. Each projection 51 of the blade 8 includes an aperture or passageway 53 defined therein. Apertures 53 are adapted to receive elongated wire member 45 therethrough. Accordingly, dispensing blades 8 are attached to shaft 7 and support 41 by threading elongated wire 45 through both the apertures (57 or 65) in projections 43 and the apertures 53 in blades 8. Each blade 8 is free to pivot about the axis defined by its apertures 53 so that each blade 8 can pivot in either direction about the elongated member 45 to which it is pivotally and movably attached. Because each blade 8 can pivot downward in either direction at least about 90° relative to its extended or "stand up" position (FIG. 2), the lubricant dispenser 4 may be inserted into chamber 11 through the opening defined by bore 32. This is advantageous in that a dispenser 4 may be inserted into chamber 11, with the operating outer diameter of dispenser 4 (defined by the outer diameter of blades 8) being greater than the diameter of the opening through which the dispenser is originally fed. Typically, dispenser 4 will be inserted into chamber 11 with the shaft and bearings through the annular opening defined by hole or bore 32 in the pump housing. Portion 34 is removeable so as to form the bore 32.

Figure 4:
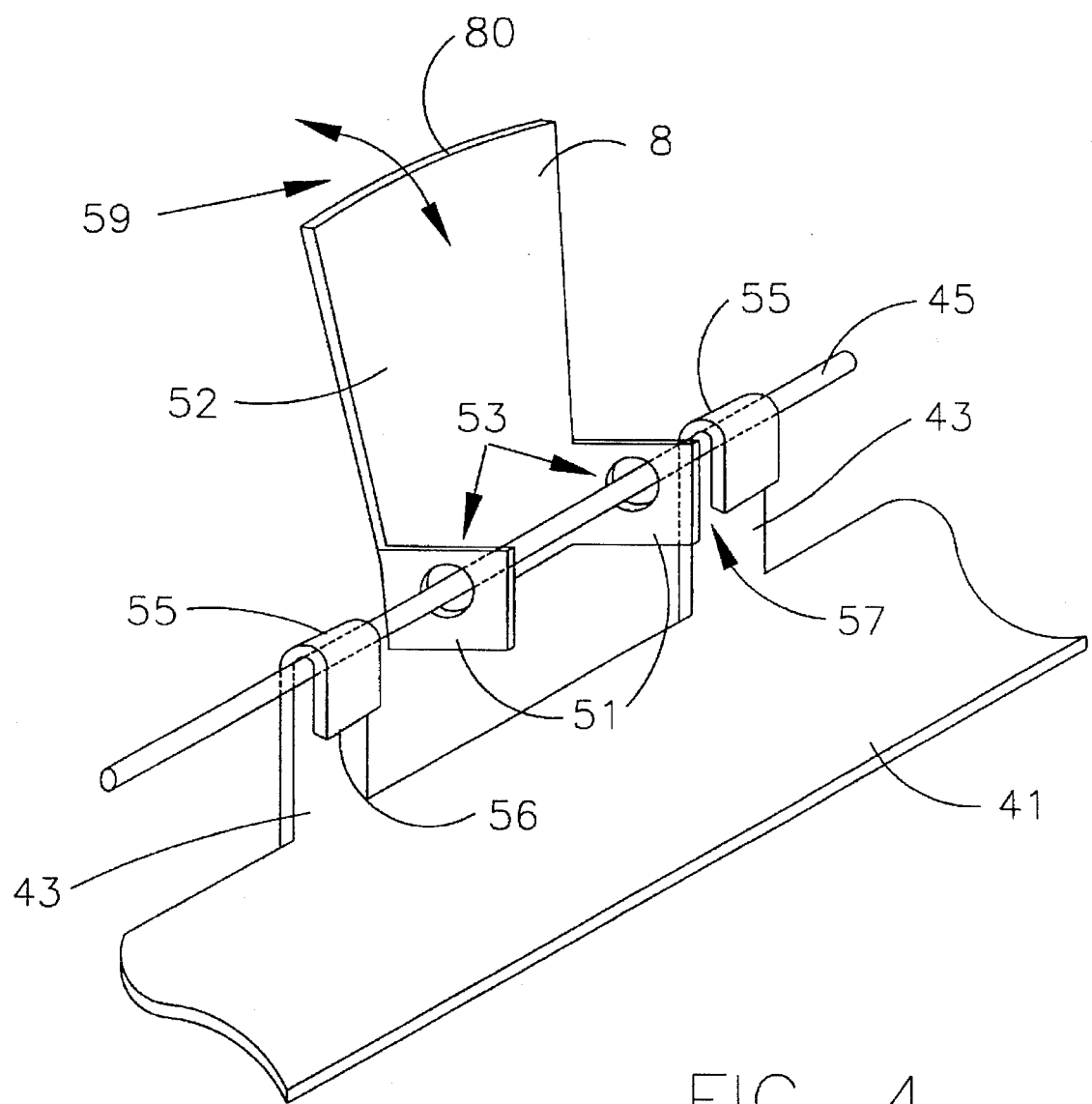
FIG. 4 is a perspective view illustrating how the FIG. 3 blade is attached to a supporting member for use in the FIGS. 1–2 embodiment.

FIG. 4 is a perspective view illustrating a blade 8 of the FIGS. 1–2 embodiment as it is pivotally attached to supporting wrap or band 41. According to this FIG. 4 embodiment, each projection 43 extending radially outward from band 41 is bent at 55 so that the distal end 56 of each projection 43 is bent back over the main body of the projection. In such a manner, a passageway 57 is defined adjacent the bent section 55 between the main body of projection 43 and the bent over portion. Each such passageway 57 is for receiving elongated wire member 45 therein as member 45 is wound about and around shaft 7. In such a manner, wire 45 is attached to shaft 7 for rotation therewith. As illustrated, blade 8 is attached to the overall dispenser 4 system between a pair of projections 43 by inserting member 45 through the two openings 53 defined in projections 51 of blade 8.

FIGS. 2 and 4 illustrate blade(s) 8 in its operating position where it is caused to extend radially away from the center of shaft 7 due to the centrifugal force created by rotation of the shaft. In other words, each dispensing member or blade 8 is in the position illustrated in FIGS. 2 and 4 when pump shaft 7 is caused to rotate during operation by the pump motor. However, as discussed above, because each blade 8 is pivotally mounted to member 45, during non-rotation of shaft 7, the blades 8 on the upper side of the pump shaft flop or pivot downward about the axis defined by member 45. As illustrated by arrow 59 in FIG. 4, each blade 8 may pivot about the axis defined by member 45 at least about 90° in either direction from its illustrated operating position.

Figure 5:
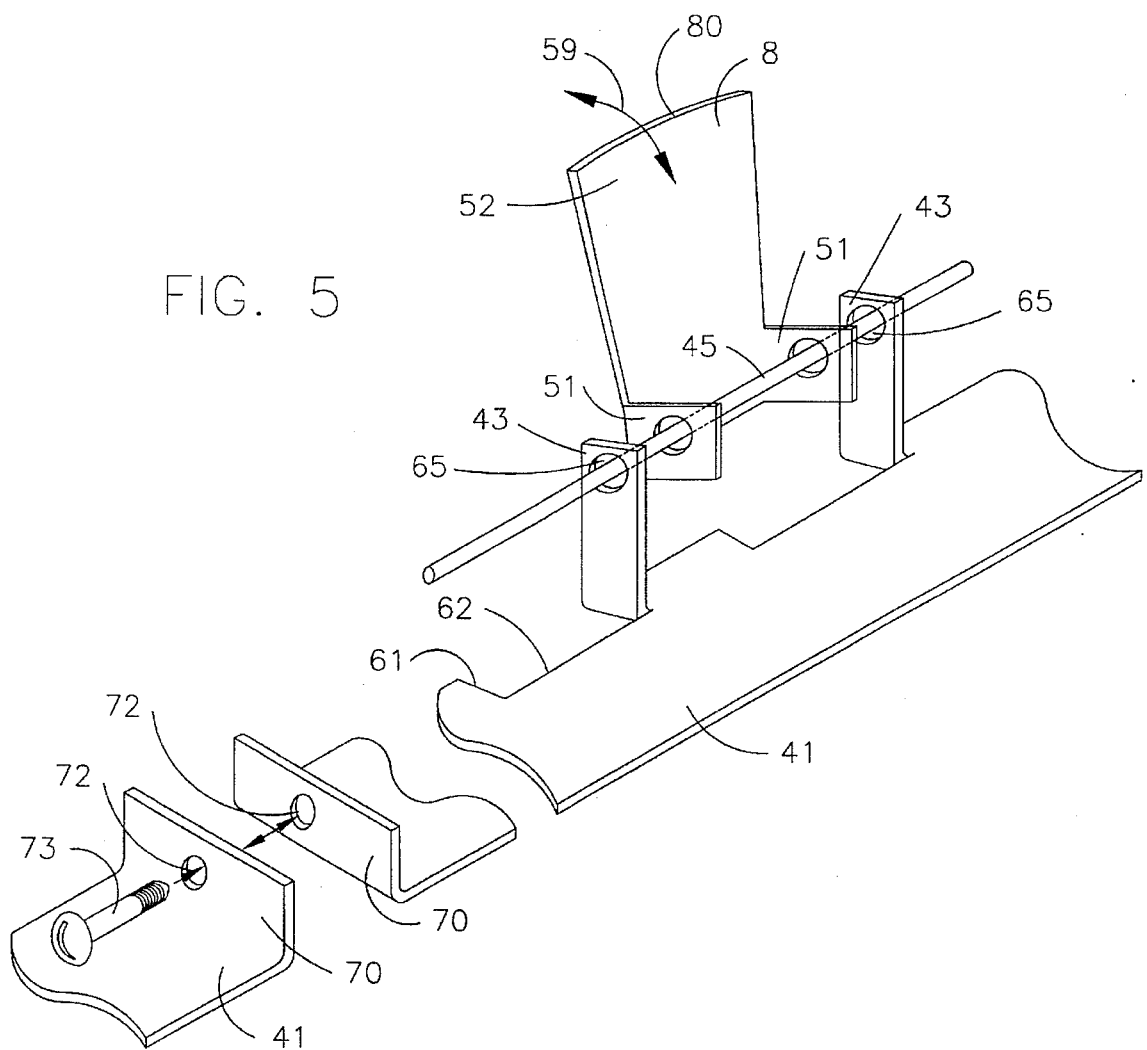
FIG. 5 is a perspective view illustrating another embodiment of how the FIG. 3 blade may be attached to its corresponding supporting member and the shaft in FIGS. 1–2.

FIG. 5 is a perspective view illustrating support band 41 according to another embodiment of this invention. The support band of the FIG. 5 embodiment (see also FIG. 1) differs from that of FIG. 4 in that projections 43 are formed in a different manner. According to the FIG. 5 embodiment, projections 43 which extend radially outward from the center of shaft 7 are formed in band 41 by cutting the band at 61 and 62 (these cuts at right angles to one another), and bending the remaining portion upward to form the projection 43. Apertures 65 may be formed in projections 43 either before or after cuts 61 and 62 are made in the base member 41.

Also illustrated in FIG. 5 are the two ends 70 of band 41. Each end 70 of support band 41 includes an aperture 72 defined therein. Apertures 72 are adapted to receive a fastener 73, such as a bolt and corresponding nut, for the purpose of securing band 41 around the external periphery of shaft 7. In such a manner, support band 41 is wrapped around the outside of shaft 7, with the two ends 70 of band 41 being secured to one another by way of fastener 73 extending through mating apertures 72. A corresponding nut may be provided on the end of fastener 73 for the purpose of maintaining support band 41 in a secured position affixed around the pump shaft for rotation therewith.

It is also worth noting, relative to FIGS. 1–5, that during operation, the distal, or radially most outward, end 80 of blades 8 is curved or arc-shaped. The curves of the ends 80 of blades 8 are formed so that, as shown in FIG. 2, if the blades were connected, the center of the resulting circle would also be the center of shaft 7. Also, it is ends 80 of blades 8 which dip into the lubricating fluid (below level 19) during rotation of shaft 7 thereby flinging or dispensing the fluid 13 throughout chamber 11 so as to lubricate the adjacent ball bearings.

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A centrifugal pump for pumping a liquid to be pumped, the pump comprising:

a pump housing;

a rotatable shaft disposed at least partially within said housing;

a lubrication chamber surrounding said shaft, said chamber for housing a lubricating fluid;

shaft support bearings disposed in or adjacent said lubrication chamber, said bearings to be lubricated by the lubricating fluid;

a dispenser including a base support member and a plurality of collapsible dispensing members pivotally attached thereto, said dispenser being attached to said shaft for rotation therewith and for dispensing the lubricating fluid in said chamber in order to lubricate said bearings; and wherein said collapsible dispensing members are pivotally attached to said support member so that said dispensing members can collapse axially along said shaft when said shaft is not rotating thereby enabling said dispenser to be more easily inserted into said chamber during the manufacture of said pump or during maintenance being performed thereon.

2. The centrifugal pump of claim 1, wherein said dispensing members are pivotally attached to said dispenser so that centrifugal force created by rotation of said shaft during operation of the pump causes said dispensing members to extend radially relative to said shaft during pump operation thereby enabling said dispensing members to dispense the lubricating fluid in said chamber.

3. The centrifugal pump of claim 2, wherein said dispenser further includes and elongated member encircling said shaft, said elongated member being attached to said support member.

4. The centrifugal pump of claim 3, wherein said plurality of collapsible dispensing members are pivotally attached to said elongated member so that said dispensing members can pivot or collapse axially along said shaft about said elongated member when said pump is not in operation.

5. The centrifugal pump of claim 4, wherein said support member is a band which encircles said shaft and is affixed thereto for rotation therewith during operation of the pump.

6. The centrifugal pump of claim 1, wherein each of said dispensing members includes (i) a main body portion for dipping into the lubricating fluid and dispensing same in said chamber during pump operation, and (ii) a pair of projections extending from said main body, each of said projections on each dispensing member having an aperture defined therein for the purpose of pivotally attaching said collapsible members to said support member.

7. The centrifugal pump of claim 6, wherein said collapsible members are arc-shaped blades.

8. The centrifugal pump of claim 1, wherein said said support member includes a band which is wrapped around said shaft and affixed thereto for rotation therewith, each end of said band having an aperture defined therein, and wherein a fastener is fed through said apertures in the ends of said band in order to fasten said band around said shaft.

9. The centrifugal pump of claim 1, wherein said support member includes a plurality of projections which extend radially away or outward from said shaft, said projections receiving an elongated member which encircles said shaft, and wherein said collapsible members are pivotally attached to said elongated member around said shaft.

10. A method of inserting a lubricant dispenser into a misting chamber of a pump, the method comprising the steps of:

providing a pump including a misting chamber therein, said pump including a bore adjacent said misting chamber through which the lubricant dispenser is to be inserted along with a shaft;

providing a lubricant dispenser having a plurality of collapsible or bendable dispensing members pivotally attached around the outer periphery thereof;

collapsing or bending said dispensing members prior to insertion of said dispenser into said chamber;

inserting said dispenser with collapsed dispensing members through said bore and into said misting chamber along with said shaft; and operating said pump so that centrifugal force created by rotation of a pump shaft to which said dispenser is attached causes said dispensing members to extend radially outward from said shaft in order to dispense lubricant throughout said misting chamber.

11. A pump comprising:

a rotatable pump shaft adapted to be rotated in order to drive a fluid pumping impeller so as to pump a fluid to be pumped;

a misting chamber surrounding said shaft;

bearings located within or adjacent said misting chamber, said bearings to be lubricated by lubricant within said misting chamber;

a lubricant dispenser affixed to said shaft for rotation therewith and located within said misting chamber, said lubricant dispenser for dispensing lubricant in said misting chamber in order to lubricate said bearings; and wherein said lubricant dispenser includes a plurality of collapsible or bendable lubricant dispensing members attached thereto, said dispensing members for extending radially relative to said shaft when said shaft is rotated thereby dispensing lubricant in said chamber in order to lubricate said bearings.

12. The pump of claim 11, wherein said dispenser includes a support band, and an elongated member attached thereto.

13. The pump of claim 12, wherein said dispensing members are pivotally attached to said elongated member so as to be able to pivot axially along said shaft when said shaft is not rotating into a collapsed position.

14. The pump of claim 13, further comprising a motor for driving said shaft.

15. The pump of claim 14, wherein said elongated member encircles said shaft and is fed through at least one aperture provided in each of said dispensing members, whereby said dispensing members are able to pivot about said elongated member in order to collapse.

16. A centrifugal pump having an adjustable bearing frame lubrication system for use in a lubrication chamber of the pump, the pump comprising:

said lubrication chamber located proximate bearings to be lubricated by lubricant in said chamber;

said bearings including at least one stationary annular bearing frame having an inner diameter defined by the inner periphery of said bearing frame;

an adjustable lubricant dispenser adapted to be attached to a pump shaft in said chamber for rotation therewith, said dispenser having a first outer diameter defined when said dispenser is in a first state for use during insertion of said dispenser through a bore and into said chamber, and a second diameter defined when said dispenser is in its second or operating state; and wherein said first diameter is less than said inner diameter of said bore and said second diameter is greater than said inner diameter of said bore.

* * * * *